United States Patent
Kountanis et al.

(10) Patent No.: US 10,691,457 B1
(45) Date of Patent: Jun. 23, 2020

(54) REGISTER ALLOCATION USING PHYSICAL REGISTER FILE BYPASS

(71) Applicant: Apple Inc., Cupertino, CA (US)

(72) Inventors: Ian Kountanis, Santa Clara, CA (US); Muawya Al-Otoom, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 44 days.

(21) Appl. No.: 15/840,311

(22) Filed: Dec. 13, 2017

(51) Int. Cl.
*G06F 9/30* (2018.01)
*G06F 9/345* (2018.01)

(52) U.S. Cl.
CPC .......... *G06F 9/30123* (2013.01); *G06F 9/345* (2013.01)

(58) Field of Classification Search
None
See application file for complete search history.

(56) References Cited

U.S. PATENT DOCUMENTS

| | | | |
|---|---|---|---|
| 6,425,072 B1 | 7/2002 | Meier | |
| 6,553,480 B1 * | 4/2003 | Cheong | G06F 9/3836 712/23 |
| 6,775,761 B2 * | 8/2004 | Wang | G06F 9/3012 712/217 |
| 2012/0005444 A1 | 1/2012 | Rupley | |
| 2014/0136819 A1 | 5/2014 | Venkaramanan | |
| 2015/0134935 A1 | 5/2015 | Blasco | |
| 2015/0178084 A1 | 6/2015 | Julier | |

OTHER PUBLICATIONS

Shen et al.; Modern Processor Design: Fundamentals of Superscalar Processors, Beta Edition; McGraw-Hill; 2003.*
Akkary, et al; "Checkpoint Processing and Recovery: Towards Scalable Large Instruction Window Processors"; Microarchitecture, 2003. MICRO-36. Proceedings. 36th Annual IEEE/ACM International Symposium on; San Diego, CA, US; Dec. 5, 2003; 12 pages.
Srinivasan; "Continual Flow Pipelines"; ASPLOS XI Proceedings of the 11th international conference on Architectural support for programming languages and operating systems; Boston, MA, USA—Oct. 7-13, 2004; pp. 107-119.

* cited by examiner

*Primary Examiner* — Corey S Faherty
(74) *Attorney, Agent, or Firm* — Kowert, Hood, Munyon, Rankin & Goetzel, P.C.

(57) ABSTRACT

An example apparatus includes a plurality of execution units, a physical register file that includes a plurality of physical registers, an instruction buffer, and a scheduling circuit. The instruction buffer may receive a group of instructions to be performed by the plurality of execution units. The scheduling circuit may allocate a physical register of the plurality of physical registers in the physical register file to store an operand of a particular instruction of the group of instructions. The scheduling circuit may also, in response to determining that a result of the particular instruction is used as an operand for a different instruction of the group of instructions, assign a tag to the particular instruction and to the different instruction to indicate that the result of the particular instruction will be sent to the different instruction without using the physical register file.

20 Claims, 9 Drawing Sheets

500

Scheduling Circuit 504

| \<td colspan=3\>Allocation Map 508 | | |
|---|---|---|
| phy addr | log addr | early |
| ⋮ | ⋮ | ⋮ |
| P42 | x0 | 0 |
| P43 | x1 | 0 |
| P44 | x2 | 0 |
| P45 | x2 (rev) | 1 |
| P46 | x2 (clrz) | 1 |
| P47 | x2 (ubfm) | 1 |
| P48 | x2 (sub) | 0 |
| P49 | x1 (add) | 0 |
| P50 | x0 (add) | 0 |
| ⋮ | ⋮ | ⋮ |

Instruction Buffer 503

| instruction | destination | source | add'l op |
|---|---|---|---|
| ⋮ | ⋮ | ⋮ | ⋮ |
| rev 510 | x2 (P45) | x2 (P44) | -- |
| clrz 511 | x2 (P46) | x2 (P45) | -- |
| ubfm 512 | x2 (P47) | x2 (P46) | #3 |
| sub 513 | x2 (P48) | x2 (P47) | #8 |
| add 514 | x1 (P49) | x1 (P43) | x2 (P48) |
| add 515 | x0 (P50) | x0 (P42) | x2 (P48) |

FIG. 5

REGISTER ALLOCATION USING PHYSICAL REGISTER FILE BYPASS

BACKGROUND

Technical Field

Embodiments described herein are related to the field of integrated circuit implementation, and more particularly to the implementation of resource allocation circuits.

Description of the Related Art

In a processor core, a scheduling circuit may retrieve instructions from an instruction cache, a fetch buffer, or other storage location. The scheduling circuit may then perform a pre-decode process on the instruction, including storing a group of pre-decoded instructions in a buffer, such as a reorder buffer, until they are issued to an execution unit. The scheduling circuit may also allocate registers to these ready-to-issue instructions in the buffer before issuing them to the execution unit. These registers may not be de-allocated until all ready-to-issue instructions in the group have been executed. A number of registers may be needed to support all instructions, depending on a size of the buffer and a number of such buffers in the processing core.

SUMMARY OF THE EMBODIMENTS

Various embodiments are disclosed. Broadly speaking, a system, an apparatus, and a method are contemplated in which an embodiment of an apparatus includes a plurality of execution units, a physical register file that includes a plurality of physical registers, an instruction buffer, and a scheduling circuit. The instruction buffer may be configured to receive a group of instructions to be performed by the plurality of execution units. The scheduling circuit may be configured to allocate a physical register of the plurality of physical registers in the physical register file to store an operand of a particular instruction of the group of instructions. The scheduling circuit may also be configured to, in response to determining that a result of the particular instruction is used as an operand for a different instruction of the group of instructions, assign a tag to the particular instruction and to the different instruction to indicate that the result of the particular instruction will be sent to the different instruction without using the physical register file In one embodiment, a method may include receiving, by a processor core, a group of instructions for execution, and, in response to determining that a result of a first instruction of the group is not used as an input argument of a different instruction of the group, allocating a physical register of a physical register file to store the result of the first instruction. The method may also include, in response to determining that a result of a second instruction of the group is used as an operand of a third instruction of the group, assigning a tag to the second instruction and to the third instruction indicating that the result of the second instruction will be sent to the third instruction without using the physical register file.

In another embodiment, an apparatus includes a plurality of execution units, a physical register file that includes a plurality of physical registers, an instruction buffer, and a scheduling circuit. The instruction buffer may be configured to receive a group of instructions to be performed by one or more of the plurality of execution units. The scheduling circuit may be configured to, in response to a determination that a result of a particular instruction is used as an operand for a different instruction, allocate a physical register in the physical register file to store the result of the particular instruction, to indicate that the physical register will store the operand of the different instruction, and to mark the physical register for early release.

BRIEF DESCRIPTION OF THE DRAWINGS

The following detailed description makes reference to the accompanying drawings, which are now briefly described.

FIG. 5 shows a block diagram of an embodiment of a physical register file and an instruction buffer.

Figure 1:
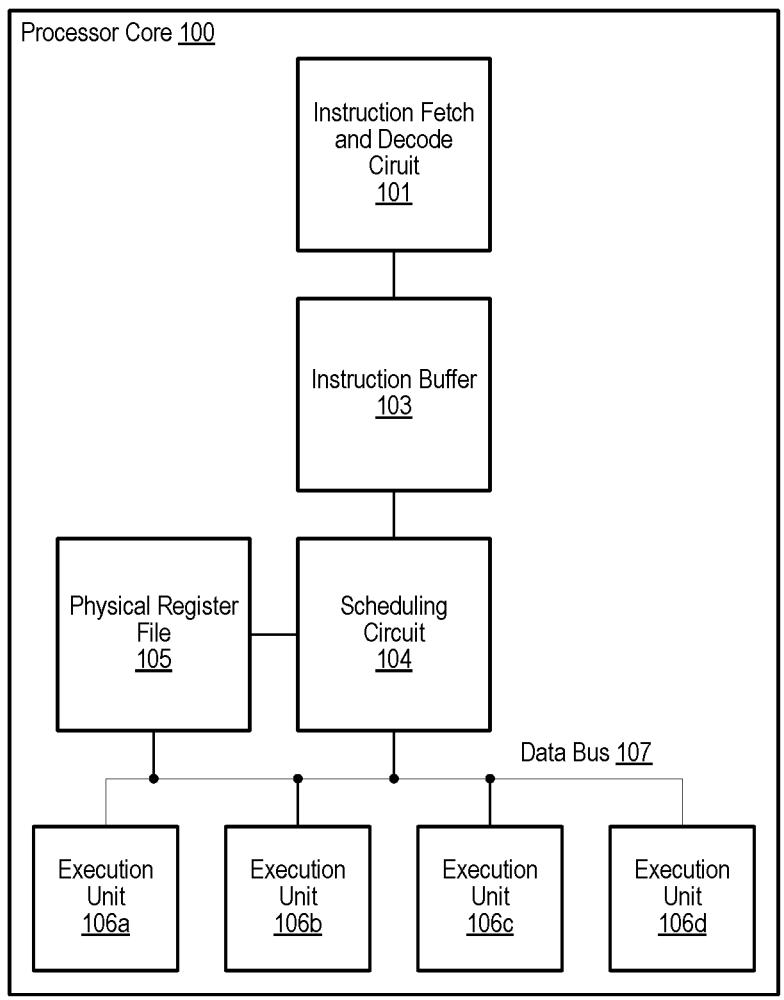
FIG. 1 illustrates a block diagram of an embodiment of a processor core.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

A processor circuit may require one or more shared resources to complete a task. Prior to starting the task, the processor circuit may issue allocation requests for any shared resources to be used in the completion of the task. In some embodiments, the processor circuit may be restricted from starting the task until all resources have been identified and allocated to the processor core for the duration of the task. A resource allocation circuit may receive the allocation requests from the processor circuit and allocate suitable resources based on the availability of the resource.

As used herein, "resource allocation" refers to a process of temporarily assigning a shared resource, or a portion of a shared resource, to a particular processor circuit, providing the particular processor circuit resources to complete a task. Furthermore, as used herein, a "shared resource" refers to any circuit with limited access that may be shared by two or more processor circuits. A shared resource may correspond to, for example, a memory, a register bank, a communication interface, a timer circuit, a cryptography circuit, and the like.

Embodiments of systems and methods for managing a resource allocation are disclosed herein. The disclosed embodiments may demonstrate improved methods for allocating resources quickly and efficiently.

A block diagram of an embodiment of processor core is illustrated in FIG. 1. In various embodiments, Processor Core 100 may correspond to a core in a general-purpose processor, a communications processor, an audio processor, and the like. Processor Core 100 includes Instruction Fetch and Decode Circuit 101, Instruction Buffer 103, Scheduling Circuit 104, Physical Register File 105, and Execution Units 106a-106d, collectively referred to as Execution Units 106.

In the illustrated embodiment, Processor Core 100 is representative of a general-purpose processor that performs computational operations. For example, Processor Core 100 may be included in a central processing unit (CPU) such as a microprocessor, a microcontroller, an application-specific integrated circuit (ASIC), or a field-programmable gate array (FPGA). In various embodiments, Processor Core 100 may implement any suitable instruction set architecture (ISA), such as, e.g., PowerPC™, MIPS, or x86 ISAs, or a combination thereof. Processor Core 100 may, in various embodiments, be coupled to memories, clock sources, power management units, and the other similar circuits on a same integrated circuit (IC), or as a standalone processor coupled to these other circuits on a circuit board.

In the illustrated embodiment, Instruction Fetch and Decode Circuit 101 fetches instructions for execution from one or more memories, such as, for example, non-volatile storage (e.g., flash memory), volatile system memory, or one or more cache memories. In some embodiments, Instruction Fetch and Decode Circuit 101 stores fetched instructions in an instruction cache included in, or coupled to Instruction Fetch and Decode Circuit 101. In addition, Instruction Fetch and Decode Circuit 101 decodes a fetched instruction, determining a type of instruction (e.g., branch, integer, floating point, load/store) and identifying operands associated with the instruction. Furthermore, a software thread or process may be identified for each instruction. A group of decoded instructions associated with a common thread may be received by Instruction Buffer 103 and stored until each instruction of the group is ready to be issued to and performed by a particular one of Execution Units 106. In various embodiments, Instruction Buffer 103 may be implemented as a random-access memory (RAM) or a bank of registers.

It is noted that the concept of instruction "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

Scheduling Circuit 104, in the illustrated embodiment, determines to which of Execution Units 106 the instructions stored in Instruction Buffer 103 are routed. In addition, Scheduling Circuit 104 may group and, in some cases, re-order, instructions in Instruction Buffer 103. In such embodiments, these groups may be referred to as re-order groups, and Instruction Buffer 103 may correspond to a re-order buffer. Scheduling Circuit 104 may also allocate a physical register in Physical Register File 105 to store an operand of a particular instruction in Instruction Buffer 103. To perform this allocation, Scheduling Circuit 104 determines if a given instruction will use a temporary storage location for input and/or output operands, and if so, allocates one or more of the physical registers to respective operands. In some embodiments, these allocated registers may remain allocated to respective operands after the respective operand has been utilized by a subsequent instruction.

Physical Register File 105 includes multiple registers used to store data to be used as operands for instructions being performed by Execution Units 106. In the illustrated embodiment, a register in Physical Register File 105 may be addressed by a physical address or other identifier. Upon allocation to a respective instruction, a logical address associated with the respective instruction is mapped to the physical address of the allocated register in Physical Register File 105. Scheduling Circuit 104 may include an allocation map table to track allocations of logical addresses to respective physical registers. Registers in Physical Register File 105 may be capable of storing any suitable number of data bits, such as, for example, 16, 32, or 64 data bits per register.

Execution Units 106a-106d may be homogeneous (e.g., similar execution circuits), heterogeneous (e.g., an integer/logical execution unit, a floating point execution unit, a load-store unit, and the like), or a combination thereof. In the illustrated embodiment, Scheduling Circuit 104 issues an instruction to one of Execution Units 106 based on one or more criteria. For example, if Execution Units 106a and 106b both correspond to integer/logical execution units while Execution Units 106c and 106d correspond to a floating-point unit and a load-store unit, respectively, then Scheduling Circuit 104 may issue an XOR instruction to one of Execution Units 106a and 106b, a divide instruction to Execution Unit 106c, and a store instruction to Execution Unit 106d. To determine which of Execution Units 106a and 106b to issue a particular instruction, Scheduling Circuit 104 may decide based on a current availability of the two execution units or based on a software thread to which the particular instruction belongs.

In the illustrated embodiment, Scheduling Circuit 104 may retire all instructions of a particular re-order group in response to determining that all of the instructions of the group have been successfully performed. In other embodiments, a particular instruction may be retired after it has been performed, and if, for example, the instruction is issued out of order, after any instruction that preceded the particular instruction is retired.

In the illustrated embodiment, Scheduling Circuit 104 may release an allocated physical register from allocation in response to a subsequent instruction reassigning the respective logical register to a different operand. A physical register, therefore, may be dedicated to its respective instruction to which it is allocated until the subsequent instruction is retired. Once released, the physical register is available for assignment to another instruction. In some cases, the subsequent instruction may not be retired for multiple clock cycles after the allocated physical register has been used and the data it stores is no longer needed. This allocated physical register may, therefore, be unavailable for use by other instructions for multiple clock cycles even if the data it holds is no longer needed by another instruction.

Scheduling Circuit 104, may, under particular conditions, assign a tag to represent an operand of an instruction rather than allocate a register from Physical Register File 105. For example, in response to a determination that a result of a particular instruction in a group of instructions is used as an operand for a different instruction in the group, Scheduling Circuit 104 may assign a tag to the particular instruction and the different instruction to indicate that the result of the particular instruction will be sent to the different instruction without using a register in Physical Register File 105. As used herein, a "tag" or "tagging" refers to using one or more particular data values in place of an address or other identifier of a physical register to indicate that data from a result of performing a particular instruction will be transferred, without using a physical register, to one of Execution Units 106 performing a different instruction.

To determine that a tag will be assigned rather than a register allocated, Scheduling Circuit 104 may determine that the different instruction is the exclusive consumer of the result of the particular instruction. "Consumer" or "consumed," as used herein, refers to an instruction that uses a result of a previously performed instruction as an input operand. To bypass use of a physical register, in the illustrated embodiment, Scheduling Circuit 104 makes at least two determinations. First, Scheduling Circuit 104 determines that a result of the particular instruction is consumed by a subsequent instruction within a group of instructions stored in Instruction Buffer 103, such as, for example, a re-order group. If no other instruction in the group consumes the result of the particular instruction, then a physical register is allocated to that result. Second, if a subsequent instruction that will use the result of the particular instruction is identified, then Scheduling Circuit 104 determines that the subsequent instruction is the only instruction, either in the group, or external to the group of instructions, that will consume the result. If two instructions within the group, or one instruction within the group and another external to the group will consume the result, then a physical register is allocated. If a single instruction within the group, however, is the only consumer of the result of the particular instruction, then Scheduling Circuit 104 assigns a common tag to both the particular instruction and the single instruction, indicating that the result will be passed to the single instruction without using a physical register.

To send the result of the particular instruction to the single instruction without using the physical register file, Execution Units 106 may be capable of writing results of performed instructions to Data Bus 107 as well as reading a result from the data bus as an operand for a subsequent instruction to be performed. In some embodiments, writing the result to Data Bus 107 may include storing the result in a data register that is part of a data bus interface. In some embodiments, if a particular one of Execution Units 106*a-d* is performing both the particular and the single instructions, the result of the particular instruction may not be placed onto Data Bus 107. By identifying a result of the particular instruction that is consumed by only a single instruction of a same group, a tag may be used to cause the result to be passed as the operand of the second instruction without allocating a physical register. A physical register, therefore, remains available for allocation to another operand which may allow for more efficient use of Physical Register File 105, and/or an ability to reduce a number of register included in Physical Register File 105, thereby allowing for a reduction of a physical size of Physical Register File 105 within an integrated circuit. In addition, bypassing storage of a result into a physical register and later reading the result from that register may, in some embodiments, provide an increase in performance by reducing an amount time used for performing an instruction.

It is noted that, to improve clarity and to aid in demonstrating the disclosed concepts, the block diagram of Processing Core 100 has been simplified. In other embodiments, different and/or additional circuit blocks and different configurations of the circuit blocks are possible and contemplated. For example, although four execution units are illustrated, any suitable number of execution units may be included.

Figure 2:
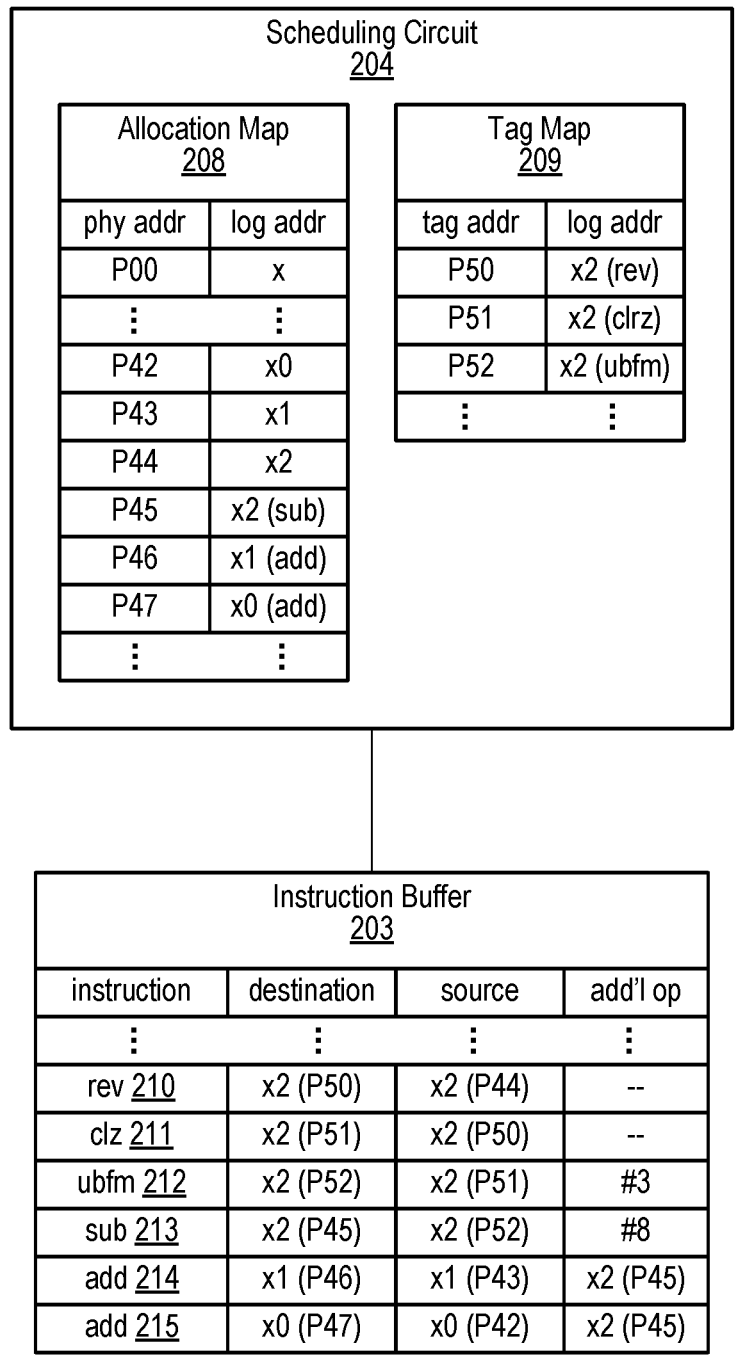
FIG. 2 shows several tables corresponding to instructions and data associated with physical register allocations in a processor core.

Turning to FIG. 2, a block diagram of an embodiment of a portion of a processing core is shown. Processor Core 200 includes Scheduling Circuit 204 and Instruction Buffer 203. Two data tables are also shown within Scheduling Circuit 204, Allocation Map 208 and Tag Map 209. In addition, six instructions are shown in a tabular form within Instruction Buffer 203. Each of the six instructions include a respective logical register address for a destination and source register. Four of the six instructions also include an additional operand (add'l op). Scheduling Circuit 204 and Instruction Buffer 203 may correspond, respectively, to Scheduling Circuit 104 and Instruction Buffer 103 in FIG. 1. Allocation Map 208 is used to maintain a mapping between logical addresses (log addr) associated with the six instructions in Instruction Buffer 203 and physical addresses (phy addr) of registers in a physical register file (e.g., Physical Register File 105). Tag Map 209 is similarly used to map a logical address to a tag address (tag addr).

The six instructions shown in Instruction Buffer 203, in the illustrated embodiment, correspond to all or part of a same group of instructions, such as a re-order group. Instruction 210 is a reverse (rev) command in which the bytes that comprise a value in logical source address x2 are placed in reverse order and stored in logical destination address x2. Since x2 is both the source and destination address, instruction 210 is the last consumer of the source data stored in x2, as x2 is overwritten with the result of the reverse instruction. In the illustrated embodiment, source x2 is a value carried over from an instruction in a previous group. Instruction 211 is a "count leading zeroes" (clz) instruction that returns a number corresponding to the number of leading zeroes in the value stored in x2 and again stores the result in x2, again overwriting the source data. Instruction 211 uses x2 which is the result of instruction 210. Since instruction 211 also stores the result in x2, instruction 211 is the exclusive consumer of the result of instruction 210.

Instruction 212 is an unsigned bit field move (ubfm) instruction that shifts a number of data bits from the source x2 register into the destination register, also x2. Once again, the source data is overwritten by the result of the instruction. In this example, instruction 212 includes a third operand, "#3," that indicates the number of bits (3) of the source to shift into the destination. Instruction 212 is the exclusive consumer of the result of instruction 211. Instruction 213 is a subtract (sub) instruction that subtracts the additional operand (the value 8) from the data in the source register, x2, and stores the result back into register x2, thus overwriting the source data in x2. Instruction 213 is the exclusive consumer of the result of instruction 212.

Instructions 214 and 215 are both add instructions that add an additional operand to the source operand and store in the destination register. Instruction 214 adds the result of instruction 213 to the value in register x1 and stores the result in x1. In this case, the value in x2 is not overwritten, and therefore, the value in x2 may be used again, which it is in instruction 215. Instruction 215 adds the value in x2 to the value in x0 and stores the result in x0. The values in x1 and x0, in this example, are received from instructions in a previously performed group of instructions.

In the illustrated embodiment, Processor Core 200 includes a physical register file (not shown) with registers addressed starting from "P00" and continuing up to, but not including, "P50." The address values "P50" through "P53" represent tag addresses (or simply "tags") to be used as identifiers to indicate that a physical register is not assigned and that a direct transfer of corresponding data will be performed instead. It is noted that tag addresses are not associated with a physical location, but are instead used as indicators. In some embodiments, a suitable range of addresses may be reserved for use as tag addresses. To allocate a physical register to store an operand for a particular instruction in Instruction Buffer 203, Scheduling Circuit 204 may associate an identifier of an allocated physical register with the particular instruction. For example, referring to Allocation Map 208, Scheduling Circuit 204 has allocated physical registers at addresses P42, P43, and P44 to logical register addresses x0, x1, and x2, respectively. These three allocations, in the present example, were allocated during execution of a previous group of instructions. For the group of six instructions shown in Instruction Buffer 203, Scheduling Circuit 204 allocates P45 to the result of the sub instruction 213, P46 to the result of the add instruction 214, and P47 to the result of the add instruction 215. It is noted that the information shown in parenthesis in FIG. 2 is included for clarity, and is not intended to indicate that the parenthetical information is stored in the respective table cells.

For the results of instructions 210, 211, and 212, Scheduling Circuit 204 assigns a tag to each respective instruction indicating that the result will not be stored in a physical register when the respective instruction is performed. Tag P50 is assigned to the result of instruction 210, P51 to the result of instruction 211, and P52 to the result of instruction 212. In addition, Scheduling Circuit 204 assigns these tags to the consuming instructions of these results to indicate that the respective source data will be received without using physical registers. Scheduling Circuit 204, therefore, assigns tag P50 to the source of instruction 211, P51 to the source of instruction 212, and P52 to the source of instruction 213. It is noted that the use of tag addresses in this example of six instructions reduces a number of allocated physical registers by three.

It is also noted that the embodiment of FIG. 2 is merely an example. The illustration of FIG. 2 has been simplified to highlight features relevant to this disclosure. Various embodiments may include a different number of physical registers, as well as a different number of instructions included in a group of instructions in an instruction buffer. The instructions included in the example may correspond to one particular ISA. In other embodiments, any suitable instructions corresponding to any suitable ISA may be used.

Figure 3:
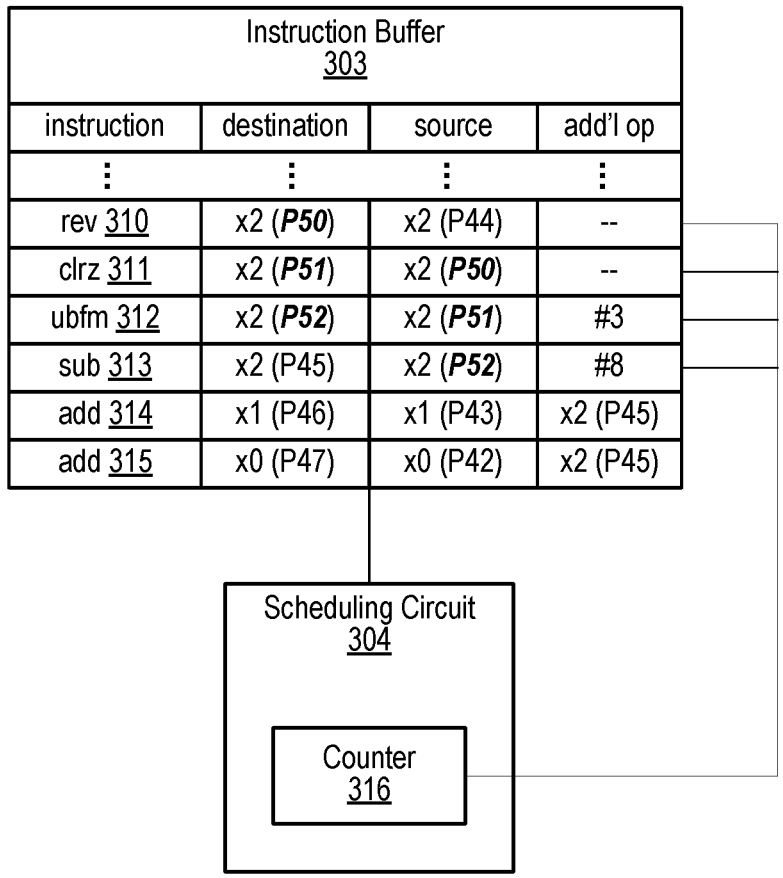
FIG. 3 depicts a block diagram of an embodiment of a scheduling circuit and an instruction buffer.

Moving to FIG. 3, a block diagram of an embodiment of another portion of a processing core is shown. Processing Core 300 may correspond to Processor Core 100 or 200, and includes Instruction Buffer 303 coupled to Scheduling Circuit 304. Six instructions are shown in a tabular form within Instruction Buffer 303. These instructions correspond to the six instructions shown in FIG. 2, and, therefore, descriptions associated with the instructions are as described above. Scheduling Circuit 304 includes Counter Circuit 316.

Similar to the description of Scheduling Circuit 204 in FIG. 2, Scheduling Circuit 304 assigns tags to instructions that will transfer results without using physical registers, and instructions that will receive these results as source operands. Referring to Instruction Buffer 303, Scheduling Circuit 304 assigns tags to respective results of instructions 310, 311 and 312, and to respective source operands for instructions 311, 312, and 313. To assign a particular tag value to each instruction, Scheduling Circuit 304 increment Counter Circuit 316 and associates a current count value of Counter Circuit 316 with each pair of instructions.

As an example, to assign the tag, P50, Scheduling Circuit 304 may increment Counter Circuit 316, resulting in a count value that corresponds to the tag address "P50." Scheduling Circuit 304 then assigns P50 to the destination operand of instruction 310 and the source operand of instruction 311. Similarly, Scheduling Circuit 304 increments Counter Circuit 316 again for the result of instruction 311, resulting in a count value corresponding to tag address "P51." P51 is, therefore, assigned to the destination operand of instruction 311 and the source operand of instruction 312. This process is repeated again to assign P52 to the destination operand of instruction 312 and the source operand of instruction 313.

In the illustrated embodiment, after the group of instructions 310 through 315 is performed by one or more execution units, such as, for example, Execution Units 106 in FIG. 1, they may be retired. After retirement of the group of instructions, tags P50 through P52 are no longer assigned to their respective pairs of instructions. Scheduling Circuit 304 may reset Counter Circuit 316 to an initial value and tags P50 through P52 may be used again.

It is noted that, although Counter Circuit 316 is described as being incremented before assigning a corresponding tag to an instruction, in other embodiments, the current count value of Counter Circuit 316 may be used as a tag first and then incremented after the tag has been assigned. Additionally, the count value of Counter Circuit 316 may be decremented between tag assignments rather than incremented.

It is noted that the circuits described in FIG. 3 are examples of an instruction buffer and scheduling circuit. Other functional circuits associated with a processing core have been omitted for clarity. Other embodiments of an instruction buffer and scheduling circuit may include a different number of instructions in the instruction buffer.

Figure 4:
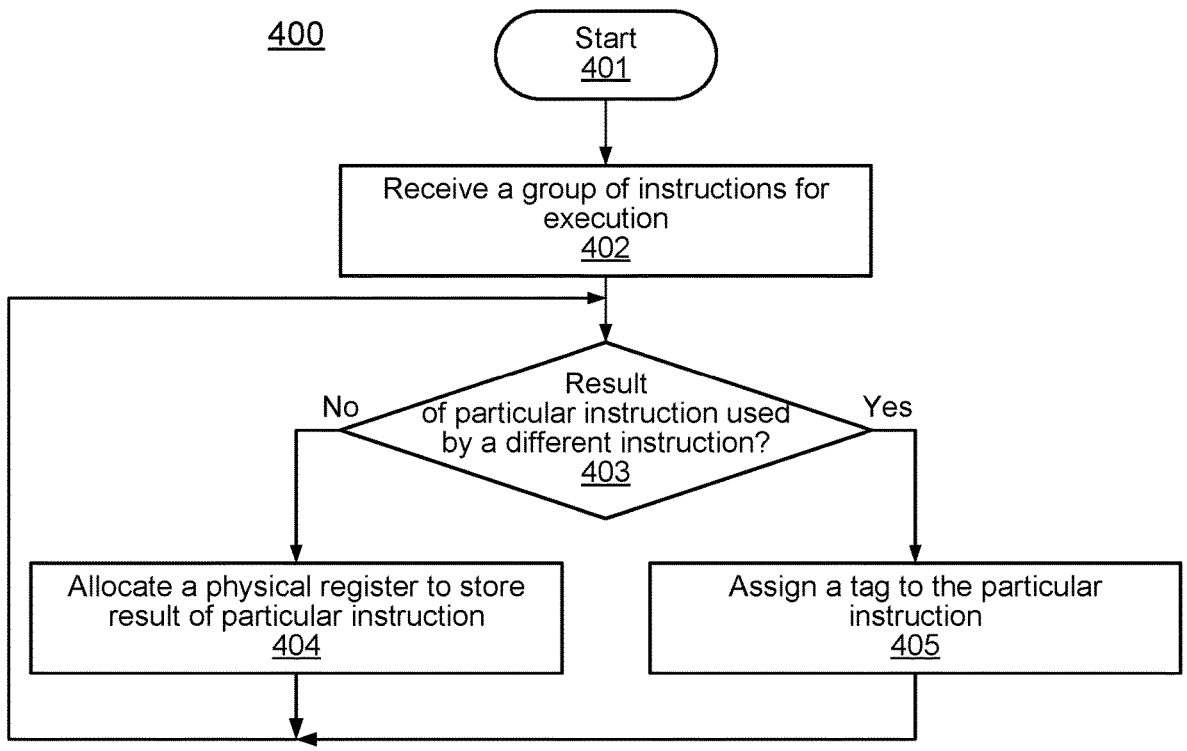
FIG. 4 illustrates a flow diagram of an embodiment of a method for allocating physical registers in a processor core.

Turning now to FIG. 4, a flow diagram of an embodiment of a method for allocating registers to program instructions is illustrated. Method 400 may be applied to a Scheduling Circuit, such as, for example, Scheduling Circuits 104, 204, or 304 in FIGS. 1-3, respectively. Referring collectively to FIG. 1 and the flow diagram of FIG. 4, Method 400 begins in block 401.

A processor core receives a group of instructions for execution (block 402). In the embodiment illustrated in FIG. 1, Processor Core 100 receives, using Instruction Fetch and Decode Circuit 101, a group of instructions, and stores the group in Instruction Buffer 103. In some embodiments, the group may correspond to a group of instructions stored in a re-order buffer. In other embodiments, the group may correspond to a group of instructions stored in a fetch buffer, or a cache line. The group of instructions may be decoded and prepared for issue to an execution unit of Execution Units 106.

Further operations may depend on subsequent usage of a result of a particular instruction (block 403). A scheduling circuit, such as, e.g., Scheduling Circuit 104, reviews instructions in the group and determines, for each instruction, if a result of the instruction is used as an operand of a different instruction of the group. If Scheduling Circuit 104 determines that a result of the particular instruction of the group is not used as an input argument of another instruction of the group, then the method moves to block 403 to allocate a physical register. Otherwise, if Scheduling Circuit 104 determines that a result of the particular instruction is used as an operand of a different instruction of the group, then the method moves to block 405 to assign a tag to the particular instruction. In some embodiments, Scheduling Circuit 104 may also determine if the different instruction is the exclusive consumer of the result of the particular instruction. In such embodiments, the method moves to block 404 if the different instruction is not the exclusive consumer of the result.

In response to determining that a result of the particular instruction of the group is not used as an input argument of a different instruction of the group, the scheduling circuit allocates a physical register of a physical register file to store the result of the particular instruction (block 404). In the illustrated embodiment, Scheduling Circuit 104 allocates a register from Physical Register File 105 to the destination operand (i.e., result) of the particular instruction. In some embodiments, Scheduling Circuit 104, will also allocate a register to the destination operand of the particular instruction if the result of the particular instruction is consumed by two or more instructions, either within the group of instructions or in a subsequent group of instructions. Method 400 returns to block 403 to review a next instruction of the group.

In response to determining, in block 403, that a result of a particular instruction of the group is used as an operand of a different instruction of the group, the scheduling circuit assigns a tag to the particular instruction and to the different instruction indicating that the result of the particular instruction will be sent to the third instruction without using the physical register file (block 405). Scheduling Circuit 104, in the illustrated embodiment, assigns a tag address to the destination operand of the particular instruction and to the source operand of the different instruction. In some embodiments, Scheduling Circuit 104 uses a current count value in a counter circuit to determine a tag address to assign. In such embodiments, the count value may be modified either before or after the assignment of the tag address. The method returns to block 403 to review a next instruction of the group. When all instructions of a group have been reviewed and register and tag assignments have been made, the method may return to block 402 (not shown) to receive a next group of instructions.

It is noted that the method illustrated in FIG. 4 is merely an example embodiment. Variations on this method are possible. Some operations may be performed in a different sequence, and/or additional operations may be included.

Embodiments disclosed so far have been directed to use of a tag address to indicate that a physical register allocation is not made in particular cases. Another embodiment is shown in FIG. 5 in which a physical register allocation may be made for each occurrence of a logical register, but an additional indicator is added to particular register allocations.

Moving now to FIG. 5, a block diagram of another embodiment of a portion of a processing core is shown. Processing Core 500 includes Scheduling Circuit 504 and Instruction Buffer 503. Scheduling Circuit 504 includes Allocation Map 508. In addition, Instruction Buffer 503 includes instructions 510 through 515, which correspond to the same six instructions (210-215) shown in in FIG. 2, Instructions 510-515 are part of a common group (e.g., a re-order group, a fetch group, a cache line, etc.). Each of instructions 510-515 include a respective logical register address for a destination and source register. Four of the six instructions (512-515) also include an additional operand (add'l op). Physical register assignments made by Scheduling Circuit 504 are shown in parenthesis for clarity, although this information, in some embodiments, may not be included in Instruction Buffer 503. Scheduling Circuit 504 and Instruction Buffer 503 may correspond, respectively, to Scheduling Circuit 104 and Instruction Buffer 103 in FIG. 1.

In the illustrated embodiment, Scheduling Circuit 504, like Scheduling Circuit 204 in FIG. 2, identifies instructions with a result that is exclusively consumed by another instruction in the same group. In response to determining that a result of a given instruction is not exclusively used by another instruction in the group, Scheduling Circuit 504 allocates a physical register to the result. Unlike Scheduling Circuit 204, however, if a result of the given instruction is used exclusively by one other instruction in the group of instructions, then Scheduling Circuit 504 again allocates a physical register to the result of the given instruction. Scheduling Circuit 504 also sets a value of an early release bit (the column labeled "early" in Allocation Map 508) to indicate that the allocated register is exclusively consumed by another instruction in the group. This "early" bit remains clear if the allocated register is assigned to an operand that is not exclusively consumed.

As disclosed above in regards to FIG. 2, of the six instructions 510-515 in Instruction Buffer 503, the destination operands of instructions 510, 511, and 512 are exclusively consumed by instructions 511, 512, and 513, respectively. Scheduling Circuit 504 allocates physical register P45 to the destination operand of instruction 510 and sets the early bit to a value of "1." It is noted that in other embodiments, the early release indicator may be implemented using more than one data bit and may, therefore, be set to any suitable value to indicate exclusive consumption of the corresponding register's contents. Physical register P46 is allocated to the destination operand of instruction 511 and register P47 is allocated to the destination operand of instruction 512.

Instruction 511 consumes the content of register P45 as a source operand. After instruction 511 has been performed by one of Execution Units 106, for example, Scheduling Circuit 504, in response to the early release indicator being set, releases register P45 from its allocation. The early release indicator signals to Scheduling Circuit 504 that once the content of register P45 has been received by another instruction (511 in this example), this content will not be used again. Rather than waiting for a subsequent instruction of the group to reassign register P45, register P45 is released after use and is made available for a different allocation. Similarly, registers P46 and P47 may be released after instructions 512 and 513, respectively, are performed.

It is noted that FIG. 5 is one example embodiment. In other embodiments of an instruction buffer and scheduling circuit, any suitable number of instructions and registers may be included. Information shown in the tables of FIG. 5 may, in other embodiments, be organized differently and may include additional information not shown in the illustrated embodiment.

Figure 6:
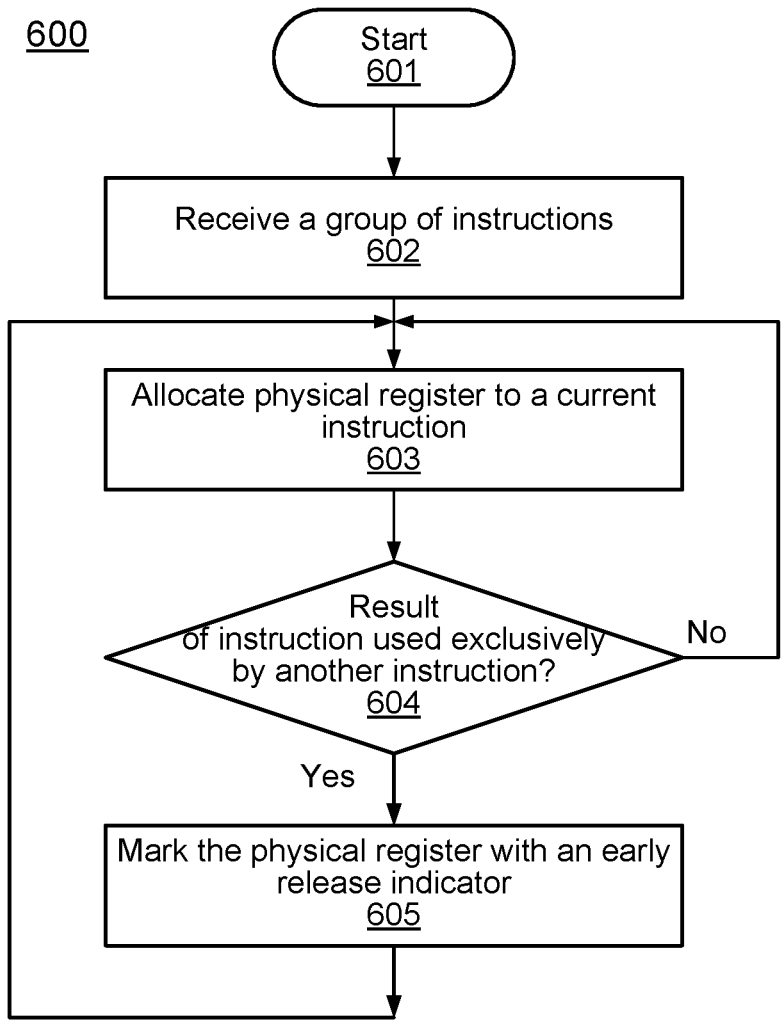
FIG. 6 depicts a flow diagram of another embodiment of a method for allocating physical registers in a processor core.

Turning to FIG. 6, a flow diagram of another embodiment of a method for allocating registers to program instructions is illustrated. Method 600 may be applied, for example, to a scheduling circuit such as Scheduling Circuits 104 or 504 in FIGS. 1 and 5, respectively. Referring collectively to FIG. 1 and the flow diagram of FIG. 6, Method 600 begins in block 601.

A processing core receives a group of instructions to be performed by one or more execution units (block 602). In the embodiment illustrated in FIG. 1, Processor Core 100 receives, using Instruction Fetch and Decode Circuit 101, a group of instructions, and stores the group in Instruction Buffer 103. In various embodiments, the group may correspond to a group of instructions stored in a re-order buffer, a fetch buffer, a cache line, or other similar grouping. The group of instructions may be decoded and prepared for issue to a suitable execution unit of Execution Units 106.

A scheduling circuit allocates a physical register in a physical register file to store a result of a current instruction (block 603). In the illustrated embodiment, Scheduling Circuit 104 reviews instructions in the group and, when the instruction produces a result, allocates a physical register, from Physical Register File 105, for storing the result of the current instruction. In some embodiments, Scheduling Circuit 104, will also indicate a physical register that has been allocated to a result from another instruction that is to be used as a source operand for the current instruction.

Further operations of the method may depend on subsequent usage of a result of the current instruction (block 604). Scheduling Circuit 104, in the illustrated embodiment, determines if a result of the current instruction is used exclusively as an operand of a different instruction of the group. If Scheduling Circuit 104 determines that a result of the particular instruction is exclusively consumed by a different instruction of the group, then the method moves to block 605 to mark the physical register that is allocated to the current instruction with an early release indicator. Otherwise, the method returns to block 603 to allocate a next register.

In response to determining that a result of a particular instruction is used as an operand for a different instruction, mark the physical register with an early release indicator (block 605). If the result of the current instruction is used exclusively as an operand of a different instruction of the group, then Scheduling Circuit 104 sets an indicator to mark that the register allocated to the result of current instruction may be released from allocation early. For example, referring to FIG. 5, if the current instruction being reviewed is instruction 511, then Scheduling Circuit 504 may set the corresponding early release indicator for register P46 to a value of "1." The method may return to block 603 to review a next instruction in the group.

It is noted that the method illustrated in FIG. 6 is an example for illustrating disclosed concepts. In other embodiments, some operations may be performed in a different sequence, and/or additional operations may be included.

Figure 7:
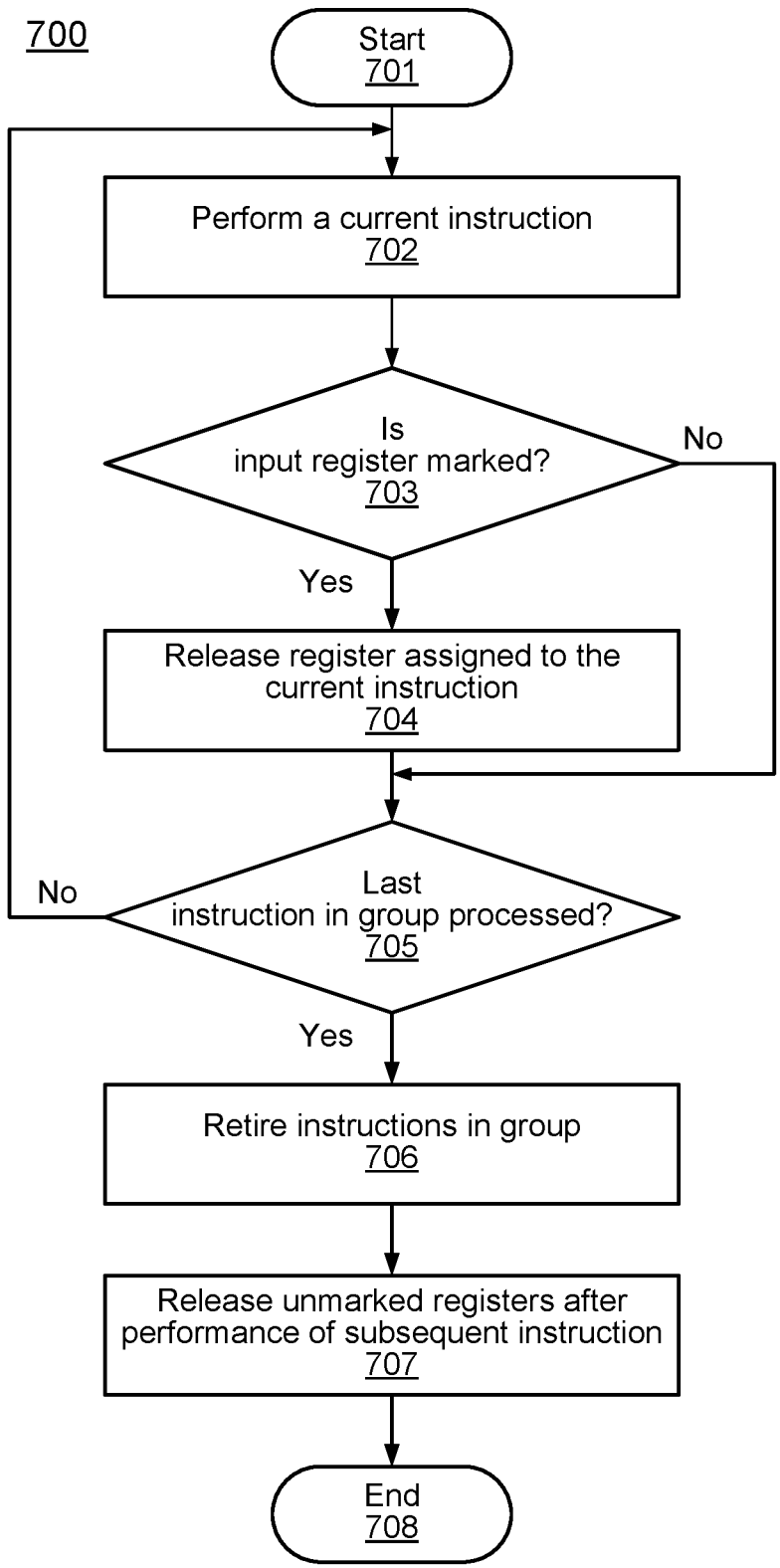
FIG. 7 illustrates a flow diagram of an embodiment of a method for de-allocating physical registers in a processor core.

Proceeding to FIG. 7, a flow diagram of an embodiment of a method for releasing registers from allocation is illustrated. Method 700 may be applied subsequent to Method 600 in FIG. 6, for example, to a scheduling circuit such as Scheduling Circuits 104 or 504 in FIGS. 1 and 5, respectively. Referring collectively to FIG. 1 and the flow diagram of FIG. 7, Method 700 begins in block 701.

An execution unit performs a current instruction (block 702). In the illustrated embodiment, a particular one of Execution Units 106 performs an instruction from a group of instructions. The group of instructions, in various embodiments, may correspond to a group of instructions stored in a re-order buffer, a fetch buffer, a cache line, or other similar grouping. A physical register from Physical Register File 105 is allocated to store a result of a previously performed instruction based on a logical register identifier included in the previously performed instruction. The value stored in the allocated register is used as the source operand of the current instruction.

Subsequent operations of Method 700 may depend on a value of an indicator corresponding to the current instruction (block 703). Scheduling Circuit 104, in the illustrated embodiment, reads an early release value corresponding to the current instruction. For example, referring to FIG. 5, if the current instruction is instruction 513, then the source operand (identified as logical register "x2") is the value in physical register P47. The early release indicator for register P47 in Allocation Map 508 is marked with a "1" to indicate that instruction 513 is the exclusive consumer of the data in register P47 and, therefore, may be released early. In contrast, if instruction 514 is the current instruction, then registers P43 and P48 supply the source operands. Per Allocation Map 508, the early release indicators for registers P43 and P48 both have a value of "0" to indicate that neither register is marked for early release. If a register corresponding to the current instruction is marked for early release, then the method moves to block 704 to release the register. Otherwise, the method moves to block 705 to determine if more instructions in the group are to be performed.

In response to determining that a register associated with a source operand of the current instruction is marked, the scheduling circuit releases the marked physical register (block 704). In the illustrated embodiment, Scheduling Circuit 104 releases the register from allocation after the current instruction is successfully performed by the particular one of Execution Units 106. For example, if instruction 513 is the current instruction, then the source is mapped to physical register P47. In some embodiments, Scheduling Circuit 104 may release physical register P47 from allocation after the instruction 513 has been performed and the result stored into register P48. In other embodiments, register P47 may be released once the value in register P47 has been read into the particular one of Execution Units 106 that will perform instruction 513. Once released, the marked register may be used for another allocation while other instructions of the group of instructions are being performed or still waiting to be performed.

Continuing operations of Method 700 may depend on the last instruction in the group of instructions (block 705). As each instruction of the group is performed, Scheduling Circuit 104 may determine if a last instruction in the group has been performed. If the last instruction of the group has been performed, then the method moves to block 706 to retire the group of instructions. Otherwise, the method returns to block 702 to perform a next instruction.

In response to determining that all the instructions of the group have been successfully performed, the scheduling circuit retires the group of instructions (block 706). Scheduling Circuit 104, in the illustrated embodiment, retires the group of instructions after all instructions in the group have been successfully performed by one or more of Execution Units 106.

The scheduling circuit releases unmarked registers after subsequent instructions have been performed (block 707). Scheduling Circuit 104 releases a currently allocated physical register after a logical register that is mapped to the physical register is used by a subsequent instruction for a different operand, and that subsequent instruction is performed and retired. For example, logical address x2 is mapped to physical register P48 by sub instruction 513 to store the result of the sub instruction. Physical register P48 may be released from this allocation after a subsequent instruction uses logical register x2 to store a value other than the result of sub instruction 513 and that instruction is retired. Once the unmarked registers are released, these registers may be used for other allocations. The method ends in block 708.

It is noted that Method 700 is merely an example of one embodiment. In other embodiments, additional operations may be included. In some embodiments, operations may be performed in a different sequence.

Figure 8:
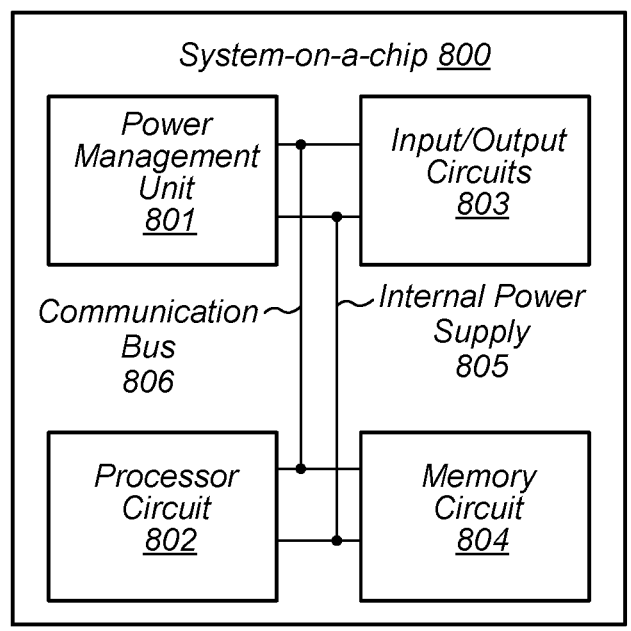
FIG. 8 shows a block diagram of an embodiment of a system-on-chip (SoC).

A block diagram of an example of a system-on-a-chip (SoC) is illustrated in FIG. 8. In some embodiments, SoC 800 may provide an example of an integrated circuit that includes Processor Core 100 in FIG. 1. In the illustrated embodiment, SoC 800 includes Power Management Unit 801, Processor Circuit 802, Input/Output Circuits 803, and Memory Circuit 804, each of which may be configured to send requests and data (collectively transactions) to other circuit blocks using Communication Bus 806. In various embodiments, SoC 800 may be configured for use in a desktop computer, server, or in a mobile computing application such as, e.g., a tablet, laptop computer, or wearable computing device.

Power Management Unit 801 may be configured to generate a regulated voltage level on Internal Power Supply 805 in order to provide power to Processor Circuit 802, Input/Output Circuits 803, and Memory Circuit 804. In various embodiments, Power Management Unit 801 may include one or more voltage regulator circuits configured to generate the regulated voltage level based on an external power supply (not shown). It is noted that although a single internal power supply is depicted in the embodiment of FIG. 8, in other embodiments any suitable number of internal power supplies may be employed.

In some embodiments, Processor Circuit 802 may, correspond to or include Processor Core 100. Processor Circuit 802, in various embodiments, may be representative of a general-purpose processor that performs computational operations. For example, Processor Circuit 802 may be a central processing unit (CPU) such as a microprocessor, a microcontroller, an application-specific integrated circuit (ASIC), or a field-programmable gate array (FPGA).

Memory Circuit 804 may correspond to Memory Circuit 101 as illustrated in FIG. 1, In various embodiments, Memory Circuit 804 may include any suitable type of memory such as a Dynamic Random Access Memory (DRAM), a Static Random Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 8, a single memory circuit is depicted. In other embodiments, any suitable number of memory circuits may be employed.

Input/Output Circuits 803 may be configured to coordinate data transfer between SoC 800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, Input/Output Circuits 803 may be configured to implement a version of Universal Serial Bus (USB) protocol or IEEE 1394 (Firewire®) protocol.

Input/Output Circuits 803 may also be configured to coordinate data transfer between SoC 800 and one or more devices (e.g., other computing systems or integrated circuits) coupled to SoC 800 via a network. In one embodiment, Input/Output Circuits 803 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, Input/Output Circuits 803 may be configured to implement multiple discrete network interface ports.

It is noted that SoC 800 of FIG. 8 is one example of an integrated circuit. A limited number of circuit blocks are illustrated for simplicity. In other embodiments, any suitable number of circuit blocks may be included.

Figure 9:
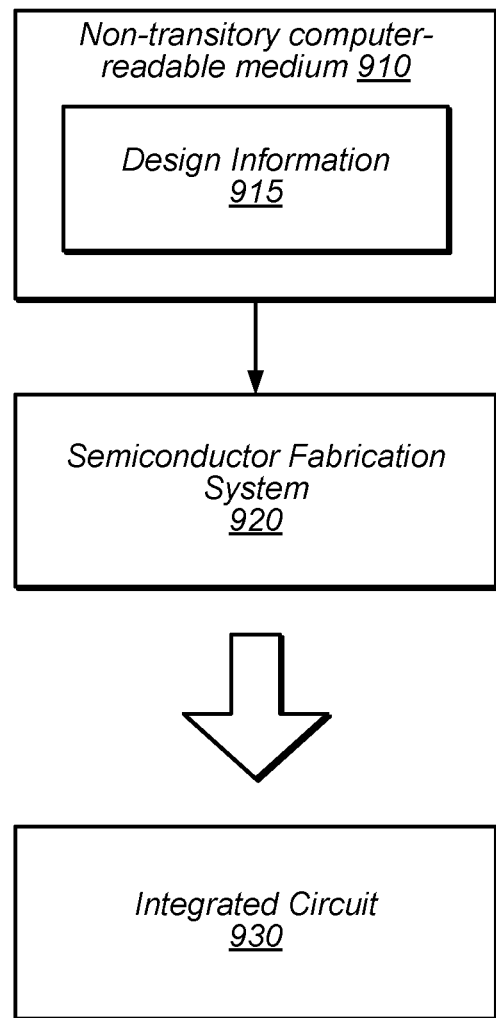
FIG. 9 is a block diagram depicting an example computer-readable medium, according to some embodiments.

FIG. 9 is a block diagram illustrating an example of a non-transitory computer-readable storage medium that stores circuit design information, according to some embodiments. The embodiment of FIG. 9 may be utilized in a process to design and manufacture integrated circuits, such as, for example, an IC that includes Processor Core 100 of FIG. 1. In the illustrated embodiment, Semiconductor Fabrication System 920 is configured to process the Design Information 915 stored on Non-Transitory Computer-Readable Storage Medium 910 and fabricate Integrated Circuit 930 based on the Design Information 915.

Non-Transitory Computer-Readable Storage Medium 910, may comprise any of various appropriate types of memory devices or storage devices. Non-Transitory Computer-Readable Storage Medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-Transitory Computer-Readable Storage Medium 910 may include other types of non-transitory memory as well or combinations thereof. Non-Transitory Computer-Readable Storage Medium 910 may include two or more memory mediums which may reside in different locations, e.g., in different computer systems that are connected over a network.

Design Information 915 may be specified using any of various appropriate computer languages, including hardware description languages such as, without limitation: VHDL, Verilog, SystemC, SystemVerilog, RHDL, M, MyHDL, etc. Design Information 915 may be usable by Semiconductor Fabrication System 920 to fabricate at least a portion of Integrated Circuit 930. The format of Design Information 915 may be recognized by at least one semiconductor fabrication system, such as Semiconductor Fabrication System 920, for example. In some embodiments, Design Information 915 may include a netlist that specifies elements of a cell library, as well as their connectivity. One or more cell libraries used during logic synthesis of circuits included in Integrated Circuit 930 may also be included in Design Information 915. Such cell libraries may include information indicative of device or transistor level netlists, mask design data, characterization data, and the like, of cells included in the cell library.

Integrated Circuit 930 may, in various embodiments, include one or more custom macrocells, such as memories, analog or mixed-signal circuits, and the like. In such cases, Design Information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor Fabrication System 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor Fabrication System 920 may also be configured to perform various testing of fabricated circuits for correct operation.

In various embodiments, Integrated Circuit 930 is configured to operate according to a circuit design specified by Design Information 915, which may include performing any of the functionality described herein. For example, Integrated Circuit 930 may include any of various elements shown or described herein. Further, Integrated Circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of execution units;
   a physical register file including a plurality of physical registers with respective address values;
   an instruction buffer configured to receive a group of instructions to be performed by the plurality of execution units; and
   a scheduling circuit configured to:
      determine a number of instructions of the group of instructions that consume a result of a particular instruction;
      in response to a determination that a plurality of instructions in the group of instructions consume the result, associate a respective address of a particular physical register of the plurality of physical registers to store the result of the particular instruction; and
      in response to a determination that a single instruction of the group of instructions consumes the result, associate a tag address to the particular instruction and the consuming instruction, wherein the associated tag address indicates that the result of the particular instruction is not to be written to the physical register file.

2. The apparatus of claim 1, wherein the scheduling circuit is further configured to retire all instructions of the group, in response to a determination that all the instructions of the group have been successfully performed.

3. The apparatus of claim 1, wherein to associate the respective address of the particular physical register to store the result of the particular instruction, the scheduling circuit is further configured to map a logical register corresponding to an operand of the particular instruction to the particular physical register.

4. The apparatus of claim 1, wherein the scheduling circuit is further configured to determine if the result of the particular instruction is used as the operand for the different instruction by determining that the different instruction is an exclusive consumer of the result of the particular instruction.

5. The apparatus of claim 1, wherein the scheduling circuit is further configured to reserve, for use as tag addresses, a range of addresses that are not associated with locations in the physical register file.

6. The apparatus of claim 1, wherein at least one execution unit of the plurality of execution units is configured to, without using the physical register file:
   send the result of the particular instruction to the single instruction by writing the result of the particular instruction to a data bus; and
   read, from the data bus, the result as an operand for the single instruction.

7. The apparatus of claim 1, wherein the scheduling circuit is further configured to reorder the group of instructions in instruction buffer.

8. The apparatus of claim 1, further comprising an instruction fetch and decode circuit configured to retrieve the group of instructions from a memory, and store the group of instructions in the instruction buffer.

9. A method, comprising:
   receiving, by a processor core, a group of instructions for execution;
   in response to determining that a result of a first instruction of the group is not used as an input argument of a different instruction of the group, allocating a physical register of a physical register file to store the result of the first instruction; and in response to determining that a result of a second instruction of the group is used as an operand of a third instruction of the group, assigning a tag to the second instruction and to the third instruction indicating that the result of the second instruction will be sent to the third instruction without using the physical register file.

10. The method of claim 9, further comprising writing the result of the first instruction to the physical register, and reading, from the physical register, the result as an operand for a different instruction.

11. The method of claim 9, further comprising writing the result of the second instruction to a data bus and reading, from the data bus, the result as an operand for the third instruction.

12. The method of claim 9, further comprising retiring all instructions of the group in response to determining that all the instructions of the group have been successfully performed by one or more execution units.

13. The method of claim 9, wherein allocating the physical register of the physical register file to store the result of the first instruction comprises mapping a logical register corresponding to the result of the first instruction to the physical register.

14. The method of claim 9, wherein determining if the result of the second instruction is used as the operand for the third instruction comprises determining that the third instruction is an exclusive consumer of the result of the second instruction.

15. The method of claim 9, wherein assigning the tag to the second instruction and the third instruction comprises incrementing a count value, and associating the count value with the second instruction and the third instruction.

16. An apparatus, comprising:
a plurality of execution units;
a physical register file including a plurality of physical registers;
an instruction buffer configured to receive a group of instructions to be performed by one or more of the plurality of execution units; and
a scheduling circuit configured to:
in response to a determination that a result of a particular instruction is used as an operand for a different instruction:
allocate a physical register in the physical register file to store the result of the particular instruction;
indicate that the physical register will store the operand of the different instruction; and
mark the physical register for early release.

17. The apparatus of claim 16, wherein to allocate the physical register in the physical register file to store the result of the particular instruction, the scheduling circuit is further configured to map a logical register corresponding to the operand to the physical register.

18. The apparatus of claim 17, wherein the scheduling circuit is further configured to release the marked physical register from allocation, in response to a determination that the different instruction has been successfully performed.

19. The apparatus of claim 17, wherein the scheduling circuit is further configured to release the marked physical register from allocation, in response to a determination that the result has been read from the marked physical register by a particular execution unit of the plurality of execution units that is performing the different instruction.

20. The apparatus of claim 1, wherein to associate the tag address to the particular instruction and to the single instruction, the scheduling circuit is further configured to increment a counter and use a value of the counter to determine the tag address.

* * * * *